United States Patent Office 2,994,632
Patented Aug. 1, 1961

2,994,632
LAMINATED COMPOSITIONS AND METHOD FOR THEIR PREPARATION
Harold P. Brown, Akron, and John F. Anderson, Cuyahoga Falls, Ohio, assignors to The B. F. Goodrich Company, New York, N.Y., a corporation of New York
No Drawing. Filed Jan. 21, 1958, Ser. No. 710,190
16 Claims. (Cl. 154—139)

This invention relates to laminated structures comprising laminae of synthetic plastics with similar or dissimilar surfaces adhered together with carboxylic interpolymers and more particularly pertains to laminated structures comprising synthetic film-forming thermoplastic polymers and carboxyl-containing acrylate ester interpolymers and method for preparing said laminated structures.

It is an object of this invention to provide laminated structures comprising a film-forming synthetic thermoplastic polymer adhered to a similar or dissimilar surface with at least one carboxyl-containing acrylate ester interpolymer laminating adhesive. Another object of this invention is the provision of a method for adhering a film-forming synthetic thermoplastic polymer to another surface by means of a carboxyl-containing acrylate ester interpolymer in such a manner as to produce a laminated structure.

The term "film-forming synthetic thermoplastic polymer" as used herein is defined to include linear polyester resins such as a linear highly polymerized ester of terephthalic acid and a glycol of the series $HO(CH_2)_nOH$ where $n$ is a whole number within the range of 2 to 10; linear polyvinyl halides such as polyvinyl chloride, polyvinyl bromide, polyvinylidene chloride, polyvinylidene bromide, polydichlorodifluoro ethylene, polychlorotrifluoro ethylene, and the like; polymonoolefins such as polyethylene, polypropylene, polybutene-1, and the like; post-halogenated, sulfohalogenated and hydrohalogenated polymers of the aforesaid types such as chlorinated polyvinyl chloride, chlorinated polyethylene, sulfochlorinated polyethylene and the like; halogenated rubbers, hydrohalogenated rubbers and sulfohalogenated rubbers; and plasticized and unplasticized compositions containing as an essential ingredient at least one of the above-mentioned polymer types.

The term "carboxyl-containing acrylate ester interpolymer" as used herein is defined as a linear interpolymer resulting from the polymerization of 100 parts by weight of a monomer mixture comprising from 80 to 99 parts by weight of an acrylate ester and from 1 to 20 parts by weight of at least one alpha-beta olefinically unsaturated carboxylic monomer copolymerizable with said acrylate ester. The acrylate esters useful in this invention conform to the structure $CH_2=CH-COOR$ wherein R is a hydrocarbon group having from 1 to 20 carbon atoms and preferably the acrylate esters of said structure wherein R is a lower alkyl group having from 1 to 8 carbon atoms such as methyl acrylate, ethyl acrylate, propyl acrylates, butyl acrylates, amyl acrylates, hexyl acrylates, cyclohexyl acrylates, heptyl acrylates and octyl acrylates. The alpha-beta olefinically unsaturated carboxylic monomers useful in this invention are those containing from 3 to 6 carbon atoms such as acrylic acid, methacrylic acid, itaconic acid, maleic acid, sorbic acid and the like and their anhydrides.

The carboxylic acrylate ester interpolymers of this invention function best as laminating adhesives when they are of medium molecular weight such as that which results when said polymers are made in emulsion and in solution in the presence of from .1 to 5 parts of a modifying agent such as diisopropyl xanthogen disulfide. The carboxyl-contaiining acrylate ester interpolymers which are prepared in a solvent which has a chain transfer or chain terminating action on the polymer, however, often do not need a modifying agent for the achievement of the proper molecular weight.

In general the carboxyl groups in the carboxylic acrylate ester interpolymers of this invention impart greater adhesive and cohesive strength to said polymers than are found in the homopolymeric acrylate esters. Acrylic acid in the carboxylic acrylate ester interpolymers impart adhesive strength and methacrylic acid in said polymers imparts cohesive strength, therefore, it is preferred to use mixtures of acrylic and methacrylic acids with the acrylate esters in the preparation of the laminating adhesives when a balance of adhesive and cohesive strength is required in the laminated products of this invention.

High percentages of carboxyl groups in the carboxyl-containing acrylate ester interpolymers of this invention generally cause stiffening of the polymer which is usually undesirable. For this reason it is preferred to use from about 5 to about 15 percent by weight based on the total monomers in the polymerization recipe of the alpha-beta-olefinically unsaturated carboxylic monomers in order that a proper balance of adhesion, cohesion and flexibility be realized in the carboxylic acrylate ester interpolymers which result.

The laminated structures of this invention have a wide variety of uses including packaging, protective coating and decorative purposes, and the like. In some of these applications such as food packaging the laminated structures must be flexible and in others such as protective wall coverings flexibility is not of prime importance. In all of said applications good adhesion and cohesion is an essential quality in the laminating adhesive. For those applications in which flexible laminated structures are required it is desirable to use as laminating adhesive a carboxyl-containing acrylate ester interpolymer in which R of the acrylate ester of structure $CH_2=CH-COOR$ is an alkyl group having from 4 to 8 carbon atoms such as butyl acrylates, amyl acrylates, hexyl acrylates, cyclohexyl acrylates, heptyl acrylates and octyl acrylates. When rigid laminated structures are required it is preferred to use as laminating adhesive a carboxyl-containing acrylate ester interpolymer in which R of the acrylate ester of the aforementioned structure has from 1 to 3 carbon atoms such as methyl acrylate, ethyl acrylate and propyl acrylates.

The carboxyl-containing acrylate ester interpolymers of this invention are prepared by conventional polymerization techniques including mass (or bulk) polymerization, emulsion polymerization and solvent polymerization. In mass polymerization the monomer mixture is allowed to polymerize in the absence of a solvent or diluent with a free radical initiator. In emulsion polymerizations the monomers are suspended in a non-solvent for the monomers and polymer such as water in the presence of an emulsifying agent and a solvent-soluble or monomer-soluble free-radical catalyst such as benzoyl peroxide, caprylyl peroxide, azobisisobutyronitrile, potassium persulfate and the like and the polymerization is conducted in an inert atmosphere. The solvent technique is similar to the emusion technique except that in the former the monomer, catalyst and polymer are soluble in the polymerization medium. For the purpose of this invention all of the above-mentioned polymerization methods are useful for the preparation of the carboxyl-containing acrylate ester interpolymers. However, the solvent method is preferred because of the excellent film clarity, the superior adhesive and cohesive strength of the polymers resulting therefrom and it is often convenient to apply the carboxyl-containing acrylate ester interpolymer to the surface of the laminae in the form of a high solids cement of the type which results directly from the solvent polymerization. Representative diluents which are useful in the solvent polymerization method for preparing the carboxyl-containing acrylate ester interpolymers of this invention include aromatic hydrocarbons such as toluene, xylene, mesitylene, benzene, and the like; aliphatic ketones such as methyl ethyl ketone, methyl isobutyl ketone and the like; halogenated hydrocarbons such as methyl chloroform, bromo trichloromethane and the like; and esters such as ethyl acetate, propyl acetate and ethyl propionate and the like and others. The preferred solvents for the polymerization of the carboxyl-containing acrylate ester interpolymers are those which are of relatively high volatility which also have some modifying action on the polymer as it forms and these solvents include toluene, xylene, bromo trichloromethane, methyl ethyl ketone and methyl isobutyl ketone.

Methods used for preparing the laminated compositions of this invention include coating one surface of a sheet or film with a cement of the carboxyl-containing acrylate ester interpolymer, allowing the solvent to evaporate and heat pressing the surface of the second lamina to the adhesive coated lamina. The carboxyl-containing acrylate ester interpolymers can be sandwiched between the laminae on a calender, the rolls of which are heated to a temperature sufficiently high to cause the adhesive polymer to fuse and adhere to the surfaces of the laminae.

In the following examples, which are illustrative of the present invention, the parts are by weight unless otherwise noted.

*Example I*

A series of carboxyl-containing polybutyl acrylates were made at 50° C. from the following recipe:

|  | A | B | C | D | E | F |
|---|---|---|---|---|---|---|
| n-Butyl acrylate | 100 | 89 | 90.9 | 100 | 89 | 90.9 |
| Methacrylic acid |  | 5.5 |  |  | 5.5 |  |
| Acrylic acid |  |  | 5.5 |  |  |  |
| Itaconic acid |  |  |  |  |  | 9.1 |
| Diisopropyl xanthogen disulfide |  |  |  | 0.35 | 0.35 | 0.35 |
| Azobisisobutyronitrile | 2.0 | 2.0 | 2.0 | 2.0 | 2.0 | 2.0 |
| Methyl ethyl ketone | 100 | 100 | 100 | 100 | 100 | 100 |

Polymerization times were from 1 to 2 days. The polymer solutions were clear, viscous and pourable and conversions were greater than 80% of theory in every case. The viscosities of polymer cements A–C were generally greater than the viscosities of polymer cements D–F.

Laminated structures were prepared by putting a uniformly thick coating of one of the above polymer cements on a strip of 0.001 inch thick aluminum foil by means of a calibrated pull down bar, allowing the solvent to evaporate, placing the coated aluminum strip on a heated steel plate with the coated side up and rolling with pressure a 0.001 inch thick film of a high molecular weight polyethylene terephthalate ester onto the coated surface of the heated aluminum foil in such a manner as to cause the polyester film to adhere uniformly to the coated surface of the aluminum foil. The resulting laminated structures were about 0.0035 inch thick when cooled to room temperature. The strength of the adhesive bond in said laminated structures was measured as the force in ounces required to pull one of the laminae apart from the other at a standard rate of rupture of the adhesive bond. The bond strength tests were run in duplicate on one inch wide strips of each laminate. The bond strengths of the aluminum foil-to-polyester laminates were determined at rupture rates of 2 and 12 inches pull per minute. The following table gives the properties of aluminum-to-polyester laminates prepared with the above designated polymeric adhesives.

| Polymeric Adhesive | Bond Strengths, Oz. | |
|---|---|---|
|  | 2″/min. pull | 12″/min. pull |
| A | 2, 2 | 6, 6 |
| B | 24, 30 | 32, 34 |
| C | 16, 18 | 20, 21 |
| D | 0, 0 | 0, 0 |
| E | 80, 90 | 112, 112 |
| F | 104, 80 | 112, 96 |

The superiority of the carboxyl-containing polybutyl acrylates as laminating adhesives in reference to polybutyl acrylates A and D is quite evident. The stability of the adhesive bond is evidenced by the fact that the laminated structure made with polymer F upon aging for 48 hours at 100° C. had bond strengths of 80 and 64 ounces at 2 inches per minute pull and 80 and 96 ounces at 12 inches per minute pull.

Laminates of the above type are useful in packaging dairy products such as butter, cheese, lard and the like because of their flexibility and their low permeability to gas and moisture.

*Example II*

A series of carboxyl-containing polyethyl acrylates were prepared in the manner described in Example I from the following recipe:

|  | A | B | C | D | E | F |
|---|---|---|---|---|---|---|
| Ethyl acrylate | 89 | 90.9 | 93.1 | 89 | 90.9 | 93.1 |
| Methacrylic acid | 5.5 |  |  | 5.5 |  |  |
| Acrylic acid | 5.5 |  |  | 5.5 |  |  |
| Itaconic acid |  | 9.1 |  |  | 9.1 |  |
| Maleic anhydride |  |  | 6.9 |  |  | 6.9 |
| Diisopropyl xanthogen disulfide |  |  |  | 0.35 | 0.35 | 0.35 |
| Azobisisobutyronitrile | 2.0 | 2.0 | 2.0 | 2.0 | 2.0 | 2.0 |
| Methyl ethyl ketone | 100 | 100 | 100 | 100 | 100 | 100 |

Aluminum foil-to-polyethylene terephthalate film laminated structures were prepared as described in Example I using polymers designated A–F in the present example as laminating adhesives. The bond strengths of these laminated structures were determined by the method described in Example I and the resulting data are listed in the following table.

| Laminating Adhesive | Bond Strengths, Oz. | |
|---|---|---|
|  | 2″/min. pull | 12″/min. pull |
| A | 32, 26 | 28, 24 |
| B | 24, 20 | 18, 16 |
| C | 26, 22 | 28, 24 |
| D | 68, 60 | 64, 44 |
| E | 96, 88 | 88, 96 |
| F | 64, 36 | 96, 54 |

Fibers which can be woven into fabrics which have a metallic sheen and excellent abrasion resistance are made by cutting the above-mentioned laminates into narrow strips.

*Example III*

Carboxyl-containing polymethyl acrylate interpolymers were prepared in the manner described in Example I from the following recipe:

|  | A | B | C | D | E | F | G | H |
|---|---|---|---|---|---|---|---|---|
| Methyl acrylate | 89 | 90.9 | 93.1 | 84.3 | 89 | 90.9 | 93.1 | 84.3 |
| Methacrylic acid | 5.5 |  |  |  | 5.5 |  |  |  |
| Acrylic acid | 5.5 |  |  |  | 5.5 |  |  |  |
| Itaconic acid |  | 9.1 |  |  |  | 9.1 |  |  |
| Maleic anhydride |  |  | 6.9 |  |  |  | 6.9 |  |
| Sorbic acid |  |  |  | 15.7 |  |  |  | 15.7 |
| Diisopropyl xanthogen disulfide |  |  |  |  | 0.35 | 0.35 | 0.35 | 0.35 |
| Azobisisobutyronitrile | 2.0 | 2.0 | 2.0 | 2.0 | 2.0 | 2.0 | 2.0 | 2.0 |
| Methyl ethyl ketone | 100 | 100 | 100 | 100 | 100 | 100 | 100 | 100 |

Aluminum foil-to-polyethylene terephthalate film laminates were prepared by the method described in Example I using polymers designated A–H in the present example. The bond strengths of said laminates are listed in the following table.

| Polymeric Adhesive | Bond Strengths, Oz. | |
|---|---|---|
|  | 2″/min. pull | 12″/min. pull |
| A | 32, 29 | 40, 32 |
| B | 27, 77 | 28, 26 |
| C | 64, 64 | 32, 40 |
| D | 32, 72 | 20, 32 |
| E | 104, 88 | 80, 64 |
| F | 76, 80 | 80, 80 |
| G | 64, 64 | 80, 64 |
| H | 32, 40 | 44, 44 |

The laminates of this example are useful for packaging fresh vegetables because of the excellent gas and moisture holding capacity of the bags constructed from said laminates.

Example IV

A series of modified carboxylic polybutylacrylates were made in an emulsion system in a nitrogen atmosphere at 50° C. in from 8 to 24 hours by employing the following recipe:

|  | A | B | C |
|---|---|---|---|
|  | Parts | Parts | Parts |
| n-Butyl acrylate | 89 | 89.9 | 87.9 |
| Acrylic acid | 5.5 | 10.1 |  |
| Methacrylic acid | 5.5 |  | 12.1 |
| Diisopropyl xanthogen disulfide | 2.0 | 2.0 | 2.0 |
| Distilled water | 200 | 200 | 200 |
| Emulsifying agent | 3.0 | 3.0 | 3.0 |
| FeSO$_4$.2H$_2$O | 0.02 | 0.02 | 0.02 |
| Sodium formaldehyde sulfoxalate | 0.12 | 0.12 | 0.12 |
| Sodium hydrosulfite | 0.04 | 0.04 | 0.04 |
| Ethylene diamine tetraacetic acid trisodium salt | 0.2 | 0.2 | 0.2 |
| Diisopropyl benzene hydroperoxide | 0.08 | 0.08 | 0.08 |

The polymers were isolated and dissolved in toluene to give a 30% solution by weight. Aluminum foil-to-polyethylene terephthalate film laminates were prepared by the procedure described in Example I using the polymers of the present example as laminating adhesives. The bond strengths for these laminates are as follows.

| Polymeric Adhesive | Bond Strengths, Oz. | |
|---|---|---|
|  | 2″/min. pull | 12″/min. pull |
| A | 96 | 112 |
| B | 14 | 44 |
| C | 5 | 7 |

This example illustrates the usefulness of carboxyl-containing acrylate ester interpolymers prepared in an emulsion system and the superior adhesive properties of the mixed acrylic-methacrylic acid interpolymers.

Example V

The laminated structures listed below were prepared with a polymer composed of 5.5 parts acrylic acid, 5.5 parts methacrylic acid and 89 parts n-butyl acrylate which was made in methyl ethyl ketone in a 50% solids recipe as described in Example I. Bond strengths were measured by the procedure described in Example I.

| Laminated Structure | Bond Strengths, Oz. | |
|---|---|---|
|  | 2″/min. pull | 12″/min. pull |
| Aluminum foil-to-polyvinylidene chloride film | 80, 80 | 64, 64 |
| Aluminum foil-to-natural rubber hydrochloride | 80, 80 | 80, 80 |
| Aluminum foil-to-plasticized [1] polyvinyl chloride film | 64, 64 | 72, 80 |
| Aluminum foil-to-polyethylene film | 72, 48 | 20, 16 |
| In an aluminum foil-to-natural rubber hydrochloride-to kraft paper laminate, the natural rubber hydrochloride-to kraft paper bond | 64, 72 | 72, 72 |
| Tin foil-to-polyvinylidene chloride film | 96, 88 | 112, 112 |
| Tin foil-to-hydrochlorinated natural rubber | 80, 88 | 88, 96 |
| Tin foil-to-polyethylene terephthalate film | 96, 80 | 96, 96 |
| Tin foil-to-polyethylene | 26, 40 | 16, 16 |
| Tin foil-to-plasticized [1] polyvinyl chloride | 56, 56 | 64, 72 |

[1] This particular film is a plasticized composition containing approximately 50 parts of dioctyl phthalate per 100 parts of polyvinyl chloride. Plasticized polyvinyl chlorides containing about the same level of other high boiling ester plasticizers work in a similar manner in this invention.

Example VI

The preferred method for preparation of the carboxyl-containing acrylate ester interpolymers of this invention is the polymerization of the monomers in a diluent which is a solvent for the monomers and the polymer. This example illustrates the use of solvent systems other than the methyl ethyl ketone system described in Examples I through IV. The polymer resulting from the polymerization of 5.5 parts acrylic acid, 5.5 parts methacrylic acid and 89 parts n-butyl acrylate in 100 parts of toluene gave aluminum foil-to-polyethylene terephthalate film bond strengths of 18 and 20 oz. at 2″ per minute pull and 26 and 23 oz. at 12″ per minute pull. A polymer of the same composition prepared in a mixture of 80 parts methyl ethyl ketone and 20 parts methyl isobutyl ketone gave laminates of aluminum foil-to-polyethylene terephthalate film having bond strengths of 48 and 66 oz. at 2″ per minute pull and 77 oz. at 12″ per mintue pull.

It is to be understood that many widely different embodiments of this invention can be made without departing from the spirit and scope thereof and this invention is not intended to be limited except as indicated in the appended claims.

We claim:

1. A laminated structure comprising a film-forming synthetic thermoplastic polymer selected from the group consisting of a linear highly polymerized ester of terephthalic acid and a glycol of the series HO(CH$_2$)$_n$OH where $n$ is a whole number within the range of 2 to 10, a polyvinyl halide, a polyvinylidene halide, a polymeric monoolefin and a hydrohalogenated rubber adhered to at least one other surface with a laminating adhesive comprising a linear interpolymer resulting from the polymerization of 100 parts by weight of a monomer mixture comprising from 80 to 99 parts by weight of lower acrylate ester and from 1 to 20 parts by weight of at least one member selected from the group consisting of alpha-beta olefinically unsaturated carboxylic acids and anhydrides having from 3 to 6 carbon atoms.

2. The laminated structure of claim 1 wherein the laminating adhesive is an interpolymer resulting from the polymerization of 100 parts by weight of a monomer mixture comprising from 80 to 99 parts by weight of an acrylate ester conforming to the structure $$CH_2=CH-COOR$$

wherein R is a hydrocarbon group of from 1 to 10 carbon atoms and from 1 to 20 percent of an alpha-beta olefinically unsaturated carboxylic acid containing from 3 to 6 carbon atoms.

3. The structure of claim 1 wherein the film-forming synthetic thermoplastic polymer is a highly polymerized polyester of an aromatic dicarboxylic acid and a glycol conforming to the structure $HO(CH_2)_nOH$ wherein $n$ is an integer having a value of from 2 to 10.

4. The structure of claim 1 wherein the film-forming synthetic thermoplastic polymer is a polyvinyl halide.

5. The structure of claim 1 wherein the film-forming synthetic thermoplastic polymer is a hydrohalogenated rubber.

6. The laminated structure of claim 1 wherein the film-forming synthetic thermoplastic polymer is a linear highly polymerized monoolefin having from 2 to 5 carbon atoms and terminal unsaturation.

7. The laminated structure of claim 1 wherein the other surface is a cellulosic material.

8. The product of claim 1 wherein the other surface is a metal.

9. The product of claim 1 wherein the other surface is a rubber.

10. A laminated structure comprising as essential elements (1) a film of a highly polymerized polyethylene terephthalate ester, (2) a laminating adhesive comprising an interpolymer of 5.5 parts by weight acrylic acid, 5.5 parts by weight methacrylic acid and 89 parts by weight butyl acrylate and (3) another surface.

11. A laminated structure comprising as essential elements (1) a film of linear polyethylene, (2) a laminating adhesive comprising an interpolymer of 5.5 parts by weight of acrylic acid, 5.5 parts by weight of methacrylic acid and 89 parts by weight of n-butyl acrylate and (3) another surface.

12. A laminated structure comprising as essential elements (1) a film of polyvinylidene chloride (2) a laminating adhesive comprising an interpolymer of 5.5 parts by weight of acrylic acid, 5,5 parts by weight of methacrylic acid and 89 parts by weight of n-butyl acrylate and (3) another surface.

13. A laminated structure comprising as essential elements (1) a film of plasticized polyvinyl chloride, (2) a laminating adhesive comprising an interpolymer of 5.5 parts by weight of acrylic acid, 5.5 parts by weight of methacrylic acid and 89 parts by weight of n-butyl acrylate and (3) another surface.

14. A laminated composition comprising as essential elements (1) a film of hydrochlorinated natural rubber, (2) a laminating adhesive comprising an interpolymer of 5.5 parts by weight of acrylic acid, 5.5 parts by weight of methacrylic acid and 89 parts by weight of n-butyl acrylate and (3) another surface.

15. The method for coating the surface of a film-forming synthetic thermoplastic polymer selected from the group consisting of a linear highly polymerized ester of terephthalic acid and a glycol of the series $HO(CH_2)_nOH$ wherein $n$ is a whole number in the range of 2 to 10, a polyvinyl halide, a polyvinylidene halide, a polymeric monoolefin and a hydrohalogenated rubber with a solution of a laminating adhesive comprising a linear interpolymer resulting from the polymerization of 100 parts by weight of a monomer mixture comprising from 80 to 99 parts by weight of a lower acrylate ester and from 1 to 20 parts by weight of at least one member selected from the group consisting of alpha-beta olefinically unsaturated carboxylic acids and anhydrides having from 3 to 6 carbon atoms in an organic solvent and removing said solvent from said coating.

16. The method for adhering the surface of a film-forming synthetic thermoplastic polymer selected from the group consisting of a linear highly polymerized ester of terephthalic acid and a glycol of the series $HO(CH_2)_nOH$ wherein $n$ is a whole number in the range of 2 to 10, a polyvinyl halide, a polyvinylidene halide, a polymeric monoolefin and a hydrohalogenated rubber to another surface which comprises applying to at least one of said surfaces a solution of a laminating adhesive comprising a linear interpolymer resulting from the polymerization of 100 parts by weight of a monomer mixture comprising from 80 to 99 parts by weight of a lower acrylate ester and from 1 to 20 parts by weight of at least one member selected from the group consisting of alpha-beta olefinically unsaturated carboxylic acids and anhydrides having from 3 to 6 carbon atoms in an organic solvent, removing the solvent from the coating, pressing the coated surface into contact with the other said surface and heating.

References Cited in the file of this patent

UNITED STATES PATENTS

| | | |
|---|---|---|
| 2,032,663 | Neher | Mar. 3, 1936 |
| 2,265,236 | Kistler | Dec. 9, 1941 |
| 2,320,533 | Muskat | June 1, 1943 |
| 2,346,036 | Leary | Apr. 4, 1944 |
| 2,438,195 | Tierney | Mar. 23, 1948 |
| 2,464,826 | Neher et al. | Mar. 22, 1949 |
| 2,557,266 | Dittmar et al. | June 19, 1951 |
| 2,628,178 | Burnett | Feb. 10, 1953 |
| 2,702,580 | Bateman | Feb. 22, 1955 |

FOREIGN PATENTS

| | | |
|---|---|---|
| 584,857 | Great Britain | Jan. 24, 1947 |